(12) United States Patent (10) Patent No.: US 9,177,287 B2
Kisenwether et al. (45) Date of Patent: Nov. 3, 2015

(54) COORDINATING GROUP PLAY EVENT FOR MULTIPLE GAME DEVICES

(75) Inventors: Joseph Kisenwether, Sparks, NV (US); Dougal Austin, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1328 days.

(21) Appl. No.: 12/619,030

(22) Filed: Nov. 16, 2009

(65) Prior Publication Data

US 2010/0069149 A1 Mar. 18, 2010

Related U.S. Application Data

(63) Continuation-in-part of application No. 12/112,389, filed on Apr. 30, 2008.

(51) Int. Cl.
*G06F 17/00* (2006.01)
*G06Q 10/10* (2012.01)

(52) U.S. Cl.
CPC ...................................... *G06Q 10/10* (2013.01)

(58) Field of Classification Search
USPC ...................................................... 463/16, 17
See application file for complete search history.

(56) References Cited

U.S. PATENT DOCUMENTS

| | | | | |
|---|---|---|---|---|
| 7,727,070 B2* | 6/2010 | Shelby et al. | ............. | 463/42 |
| 2004/0229700 A1* | 11/2004 | Cannon et al. | ........... | 463/42 |
| 2006/0073870 A1* | 4/2006 | Cannon | ................. | 463/17 |
| 2006/0073897 A1* | 4/2006 | Englman et al. | ........ | 463/42 |
| 2008/0076527 A1* | 3/2008 | Low et al. | ................. | 463/25 |
| 2009/0117979 A1* | 5/2009 | Decasa et al. | ........... | 463/20 |
| 2014/0106839 A1* | 4/2014 | Bigelow et al. | ......... | 463/16 |

* cited by examiner

*Primary Examiner* — Reginald Renwick
(74) *Attorney, Agent, or Firm* — Marvin A. Hein; Philip J. Anderson; Brooke W. Quist

(57) ABSTRACT

A networked system that provides group play features for respective end users of a plurality of game machines is provided. The gaming machines may be connected together through a peer-to-peer environment or through a network controller or other device. An eligibility score may be maintained by each gaming machine, and the eligibility score indicates eligibility to participate in the group-play bonus feature. The group-play bonus feature is initiated when a triggering event is detected. Intermediate and final results of the group-play bonus feature are provided by the eligible gaming machines to all other eligible gaming machines. Each gaming machine apportions a bonus award from a bonus pool associated with the group-play bonus feature to each player.

20 Claims, 16 Drawing Sheets

COORDINATING GROUP PLAY EVENT FOR MULTIPLE GAME DEVICES

CROSS-REFERENCE TO RELATED APPLICATIONS

This application is a continuation-in-part of U.S. patent application Ser. No. 12/112,389 filed Apr. 30, 2008, entitled COORDINATING GROUP PLAY EVENT FOR MULTIPLE GAME DEVICES, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to wagering games, gaming machines, networked gaming systems and methods, in particular to wagering games, gaming machines, networked gaming systems and methods having group play feature games.

2. Description of the Related Art

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

Some gaming machine games today include one or more progressive prize awards. In some configurations, the progressive prize may have a small probability of a player winning it; thus making it possible to have a larger progressive prize. In other game configurations, the progressive prize may be a small amount; thus allowing the player to win the progressive prize more frequently. In most typical game configurations, the player wins the progressive prize as a result of a specific game outcome within the primary or main game.

Feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays. To further stimulate excitement during feature game play, some feature games allow for group play of the feature game, that is, simultaneous play of a game common to more than one gaming machine in which multiple players either compete for a feature award or awards or a share of a common award. A common problem with these types of games is that the individual players often have different playing styles and habits, including how much each typically wagers and how fast they play. This can lead to an unfair advantage in cases where the group play feature game prize structure may favor those who have contributed the most to the potential award by wagering more, wagering more often, or both.

While gaming machines including group play feature games have been successful, there remains a need for group play feature games that provide all participating players with enhanced excitement and an increased opportunity of winning.

SUMMARY

Briefly, and in general terms, various embodiments are directed to a system for managing gaming devices in a network environment during a normal play mode and a group-play bonus feature. This system includes a group of gaming machines connected to each other over a network in a peer-to-peer environment. In one embodiment, the gaming machines are instead connected through a network controller. Each gaming machine may include an associated control program that maintains an eligibility score during normal play. The eligibility score indicates if a gaming machine is eligibility to participate in the group-play bonus feature. During the normal play mode, each gaming machine sends its eligibility score to all other gaming machines in the group of gaming machines and continuously updates the eligibility score to each gaming machine. If a triggering event is detected on one gaming machine during normal play, the triggered gaming machine sends a message to all eligible gaming machines and coordinates the start of the group-play bonus feature. Each gaming machine participating in the group-play bonus feature sends intermediate results during the group-play bonus feature to the eligible or participating gaming machines, and each gaming machine participating in the group-play bonus feature sends final results from the group-play bonus feature to the eligible gaming machines. Further, each participating gaming machine determines the amount of an award for the group-play bonus feature based on the final results from all participating gaming machines.

Various methods in a networked system to provide group play features for respective end users of a plurality of game machines are also provided. The gaming machines may be connected together through a peer-to-peer environment or through a network controller or other device. In one method, an eligibility score is maintained by each gaming machine, and the eligibility score is based on a wager amount and a rate of play for the player at the gaming machine. Also, the eligibility score indicates eligibility to participate in the group-play bonus feature. During normal play, the eligibility score of each gaming machine is sent to all other gaming machines in the group of gaming machines. In one embodiment, the eligibility score is continuously updated by the gaming machines.

The group-play bonus feature is initiated when a triggering event is detected by one or more gaming machine. The triggered gaming machine sends a message to all eligible gaming machines and coordinates the start of the group-play bonus feature. Intermediate results during the group-play bonus feature are provided by the eligible gaming machines to all other eligible gaming machines. At the conclusion of the group-play bonus feature, final results from the group-play feature are sent from each eligible gaming machine to all other eligible gaming machines in the group. Each gaming machine apportions a bonus award from a bonus pool associated with the group-play bonus feature to each player. In one embodiment, the bonus pool for the group-play bonus feature is funded may be funded by the triggered gaming machine.

During normal play of the gaming machines, a percentage of each wager is contributed to one or more bonus pools. In one embodiment, the one or more bonus pools are maintained by each gaming machine. However, the one or more bonus pools may also be maintained by a network controller through which the group of gaming machines are connected together. Still further, certain bonus pools may be maintained by the gaming machines and certain bonus pools may be maintained by the network controller.

In one embodiment, the eligibility score may be maintained by an associated control program of the gaming machines. The eligibility score may represent the amount of an award available to a player if the group-play bonus feature is triggered. However, the eligibility score may be a Boolean value indicating if the gaming machine is eligible to participate in the group-play bonus feature or not eligible to participate in the group-play bonus feature. The eligibility score may be displayed to the player on the gaming machine in real time on the main display or a secondary display of the gaming machine.

During the group-play bonus feature, each eligible or participating gaming machine may provide all other eligible or participating gaming machines with intermediate results. These intermediate results may also be displayed to the player or other casino patrons and employees to generate excitement for the group-play bonus feature. At the end of the group-play bonus feature, the bonus award issued to the players may be apportioned to the eligible or participating gaming machines based on the final results of each gaming machine. Further, each eligible gaming machine may determine the bonus award by comparing its final result with the final results of all other participating gaming machines.

Each gaming machine may maintain an expected value of the bonus pool associated with the group-play feature on each gaming machine based on the eligibility score of all networked gaming machines. The expected value of the bonus pool is the value of the total payout expected if the bonus pool is triggered. Each gaming machine or network controller may update the expected value periodically or in real time.

In one embodiment, the method of managing the group-play bonus feature may include creating or generating a unique sequence ID when the group-play bonus feature is initiated. The unique sequence ID is used by the network and gaming machines to coordinate messages sent between eligible gaming machines during the group-play bonus feature.

Other features and advantages of the claimed invention will become apparent from the following detailed description when taken in conjunction with the accompanying drawings, which illustrate by way of example, the features of the claimed invention.

DETAILED DESCRIPTION

Figure 1:
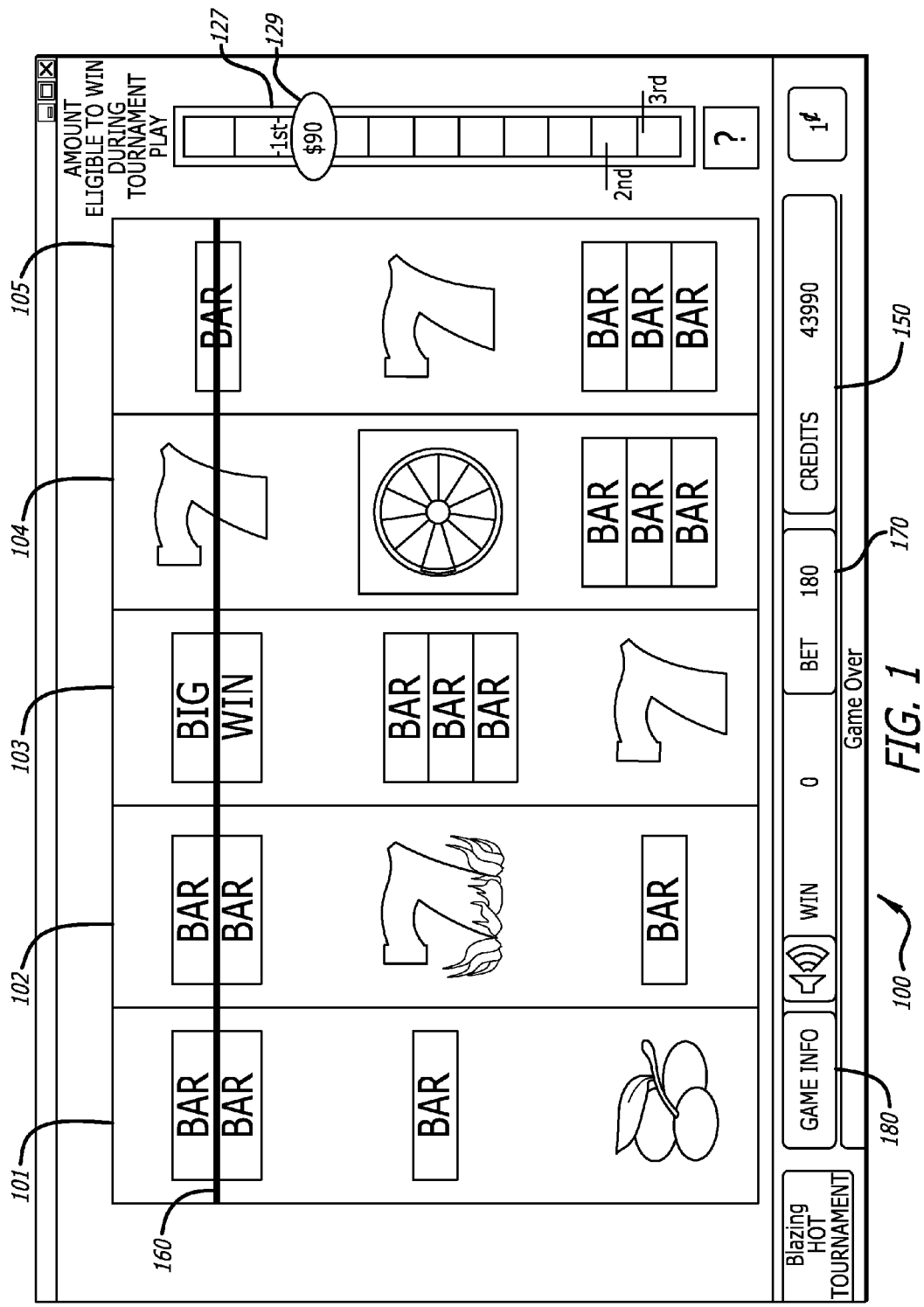
FIG. 1 provides an overview of a primary game of one embodiment of the invention.
Figure 1A:
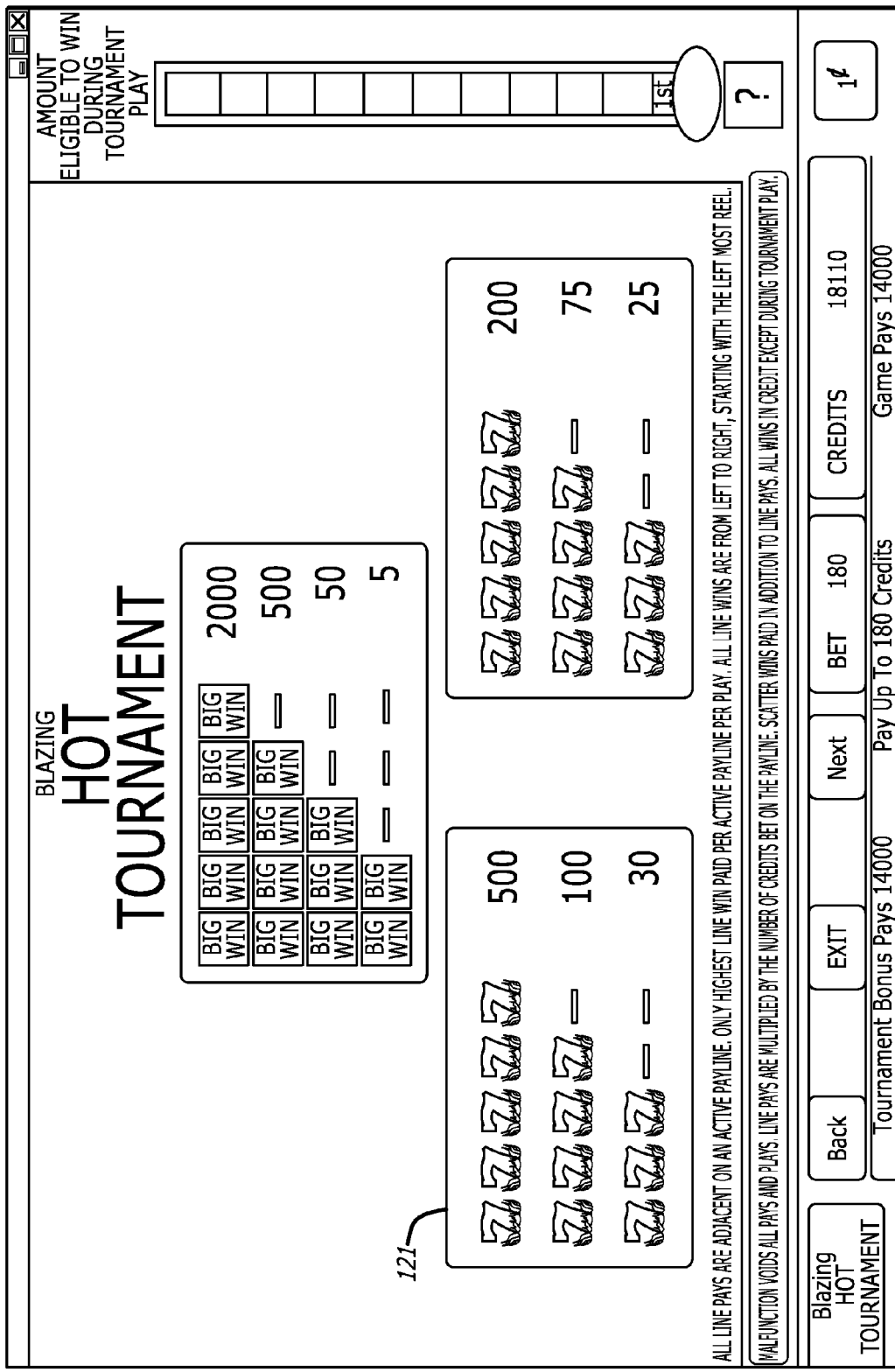
FIGS. 1A-1F illustrate example help screens in accordance with one or more embodiments of the invention.
Figure 1B:
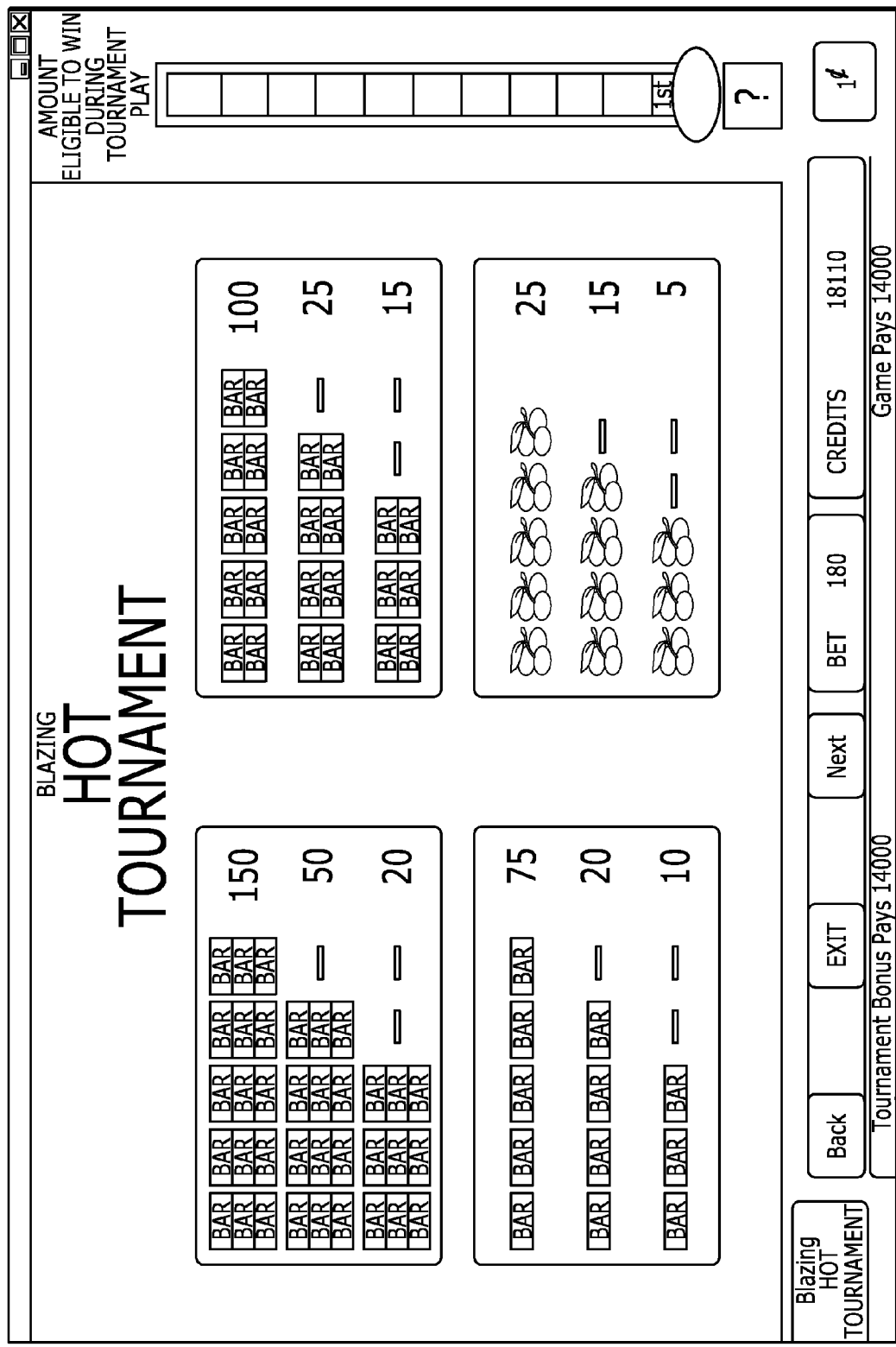

Various embodiments are directed to a game, gaming machine, gaming networks and method for playing a game, wherein the game includes a group play feature game. The embodiments are illustrated and described herein, by way of example only, and not by way of limitation. Referring now to the drawings, wherein like reference numerals denote like or corresponding parts throughout the drawings, and more particularly to FIGS. 1-8, there are shown illustrative examples of games, gaming machines, gaming networks and methods for playing a game in accordance with various aspects of the invention.

Figure 2:
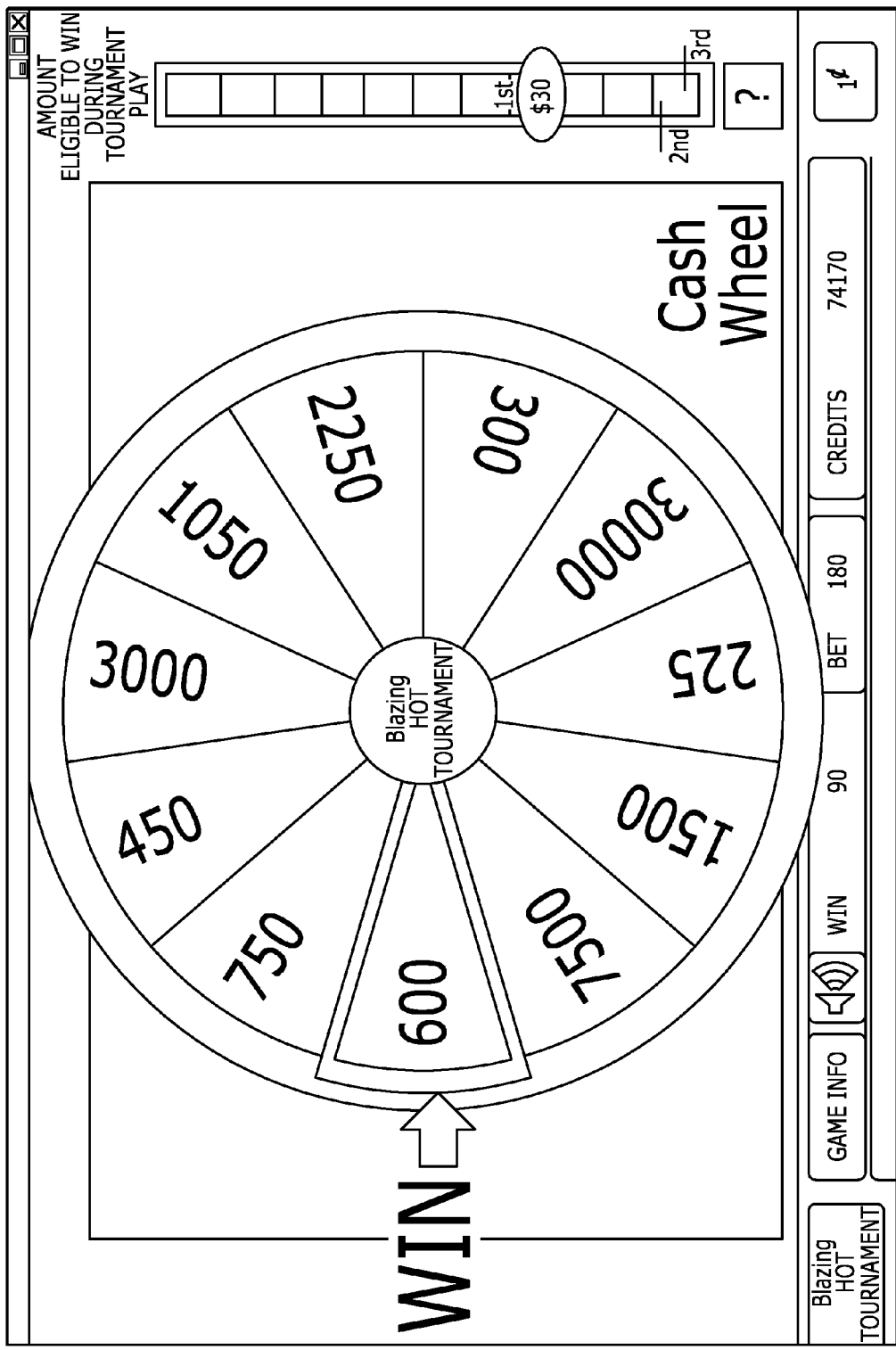
FIG. 2 illustrates an example wheel game in accordance with one or more embodiments of the invention.
Figure 3:
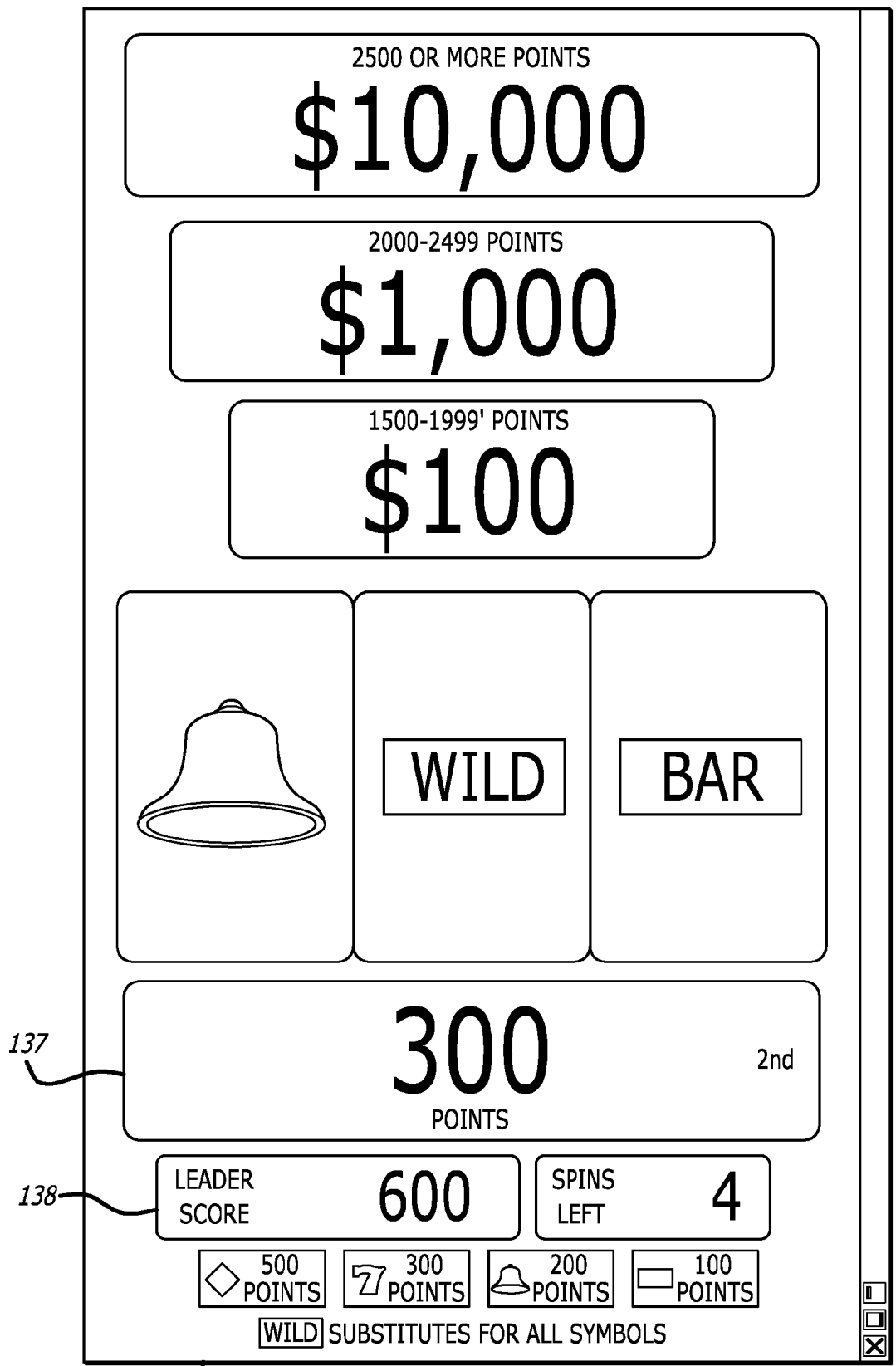
FIG. 3 illustrates an example group bonus game in accordance with one or more embodiments of the invention.

An example game in accordance with one or more aspects of the invention is shown in FIGS. 1-3. Referring to FIG. 1, game 100 is implemented using five spinning reels 101-105. Each of 20 pay line patterns (all not shown) passes through one indicium on each of the five reels. For example, a pay line 160 extends horizontally through the top row of each of the five reels 101-105. The number of pay lines and their patterns are by way of example only and may vary. The player selects the number of played pay lines and the number of credits or coins wagered on each line using touch screen controls or gaming device control buttons. CREDITS meter 150 provide the player with information about the amount paid by the last game played and the total number of credits available for play. BET meter 170 displays the size of the currently selected wager. The player may collect the balance of his credits by pressing a COLLECT button (not shown).

The player initiates game play by pressing a SPIN button (not shown). In some embodiments, the player may simultaneously select all pay lines at the maximum number of coins or credits allowed per line by pressing a MAX BET button (not shown). Various controls/buttons (see FIG. 4, 460) on gaming machine 400 (FIG. 4) or touch screen buttons may be used to perform the actions described here without deviating from the scope of the invention. Reels 101-105 are made to spin and stop in predetermined stop positions. A determination is made whether the stop positions of the reels represents a winning game outcome.

Referring to FIGS. 1A-1F, in accordance with one embodiment of the invention, the player may view pay table displays 120, 122, 124, 126, 128 and 130 on the primary game display by way of a GAME INFO 180 (FIG. 1) or similar button. In alternate embodiments, pay table displays 120, 122, 124, 126, 128 and 130 may be presented on a second video or printed display attached to the gaming device (i.e. display 453 or "pay glass" 452, FIG. 4). A winning combination, for example, could be three or more symbols adjacent to one another on an active pay line. For each winning combination, the game device awards the player the award in the pay table, adjusted as necessary based on the number of credits wagered on the pay line on which the win occurred. For example, four "Blazing Seven" symbols 121 adjacent to one another from left-to-right on an active pay line might pay 100 times the player's wager.

In some embodiments, various primary game outcomes may be utilized to trigger the play of a feature game, including, but not limited to, awarding feature play when certain symbols appear on a pay line, when certain symbols are scattered, when no symbols of a certain type appear, when a certain winning combination occurs or, regardless of the visible symbols, at random or fixed intervals. Pay table display 124 of FIG. 1C displays rules 125 related to feature game wagering.

As shown in the bonus betting rules 125, the availability of the feature game may be restricted based on the size of the wager or a percentage of each wager, in this case 20 credits out of each 60 credits wagered, may be explicitly allocated to the funding of the feature games. In one or more embodiments, each gaming machine contributes the feature percentage of each wager to one or more award pools maintained by the individual gaming machine. Each gaming machine may be part of a collection of two or more gaming machines connected to each other either through a network controller or in a peer-to-peer environment. In some embodiments with a network controller, the gaming machine communicates each wager amount to the network controller, which contributes a percentage of the wager to one or more award pools maintained by the network controller. In additional embodiments, one or more award pools may be maintained by the individual gaming machines with one or more additional pools maintained by the network controller.

Figure 1C:
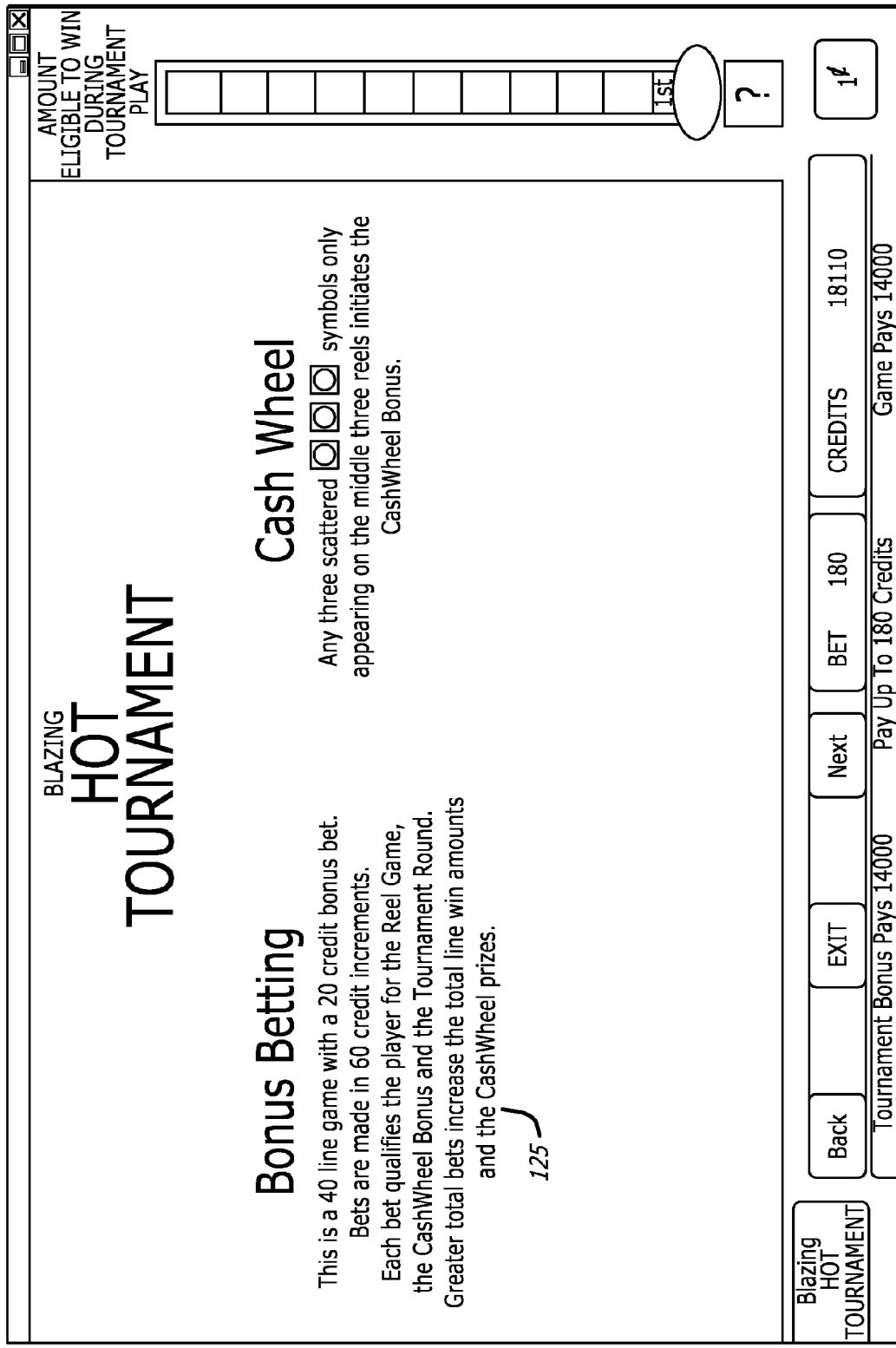
Figure 1D:
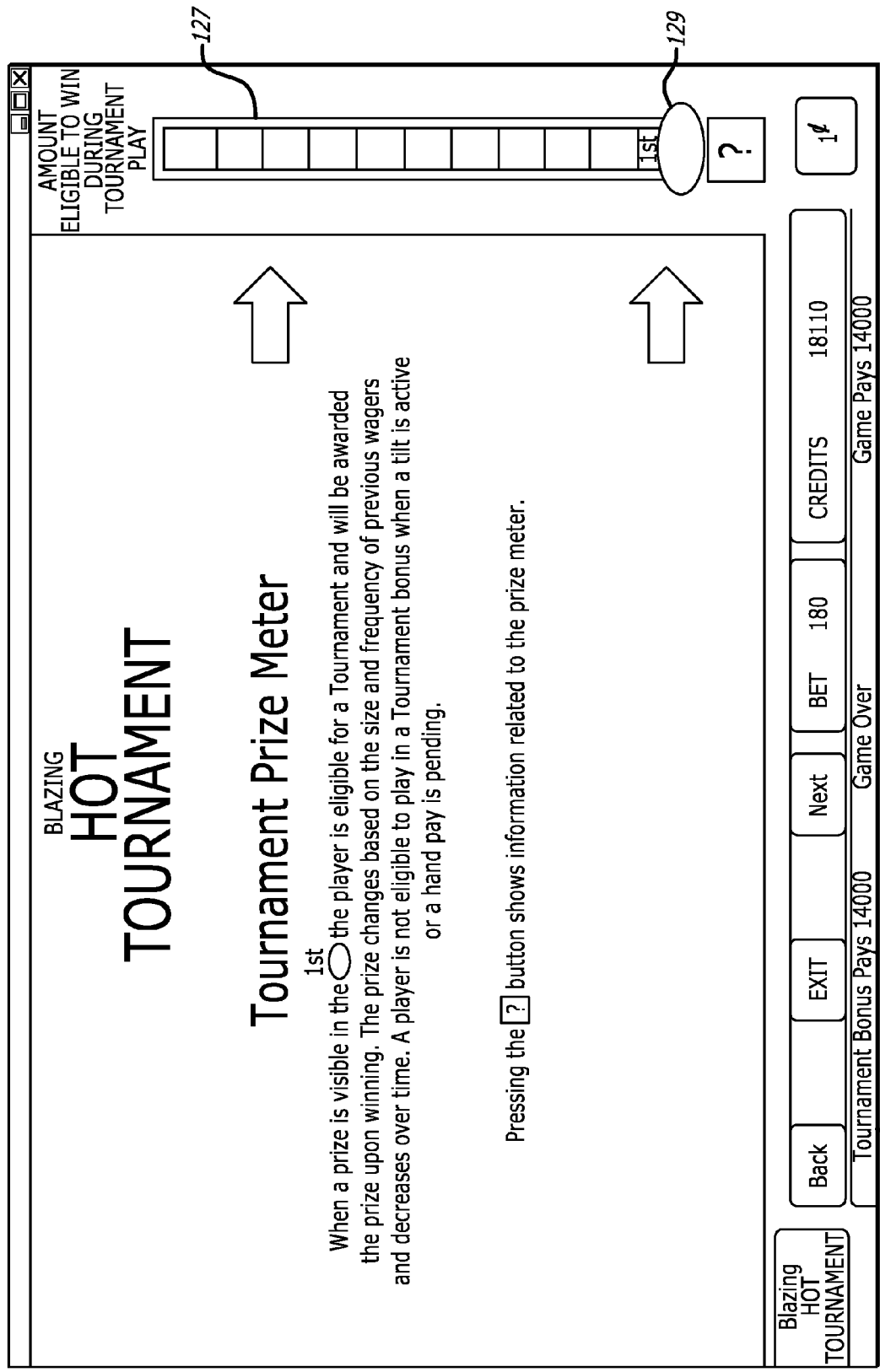

As shown, the example game provides two feature games, a CashWheel Bonus, local to the individual player, and a Tournament Round, which is a group play feature game. In the example of FIG. 1C, three scattered WHEEL symbols on reels 102, 103 and 104 may trigger the CashWheel feature. FIG. 2 depicts a screen shot 134 of the CashWheel feature.

As each gaming machine potentially participating in the group play feature is played, its associated control program maintains an eligibility score (ES). This score reflects the player's style of play and is based on bet amount and rate of play. Other factors that may affect the eligibility score include, but are not limited to gaming machine tilts, money on the credit meter, the current state of play, player's club status, and combinations thereof. The eligibility score is not only an indication of eligibility to participate in a group-play bonus, but also provides a basis to apportion a bonus award. In one embodiment, the eligibility score may be, in its simplest form, a Boolean value indicating eligible or not eligible.

As an example, one possible formula for determining an eligibility score could be as follows. The ES should be set to zero whenever: 1) the credit meter drops to zero, 2) the player is involved in a group-play bonus, and 3) a specific length of time has elapsed since the end of the last game, for example, 10 seconds, although any length of time can be set by the system before resetting the ES to zero. When the gaming machine is eligible, the ES should be a measurement of the rate with which the player is betting. In one embodiment, whenever the player makes a bet, the ES may be set to:

$$(B+(ES\cdot(L-t)))/L$$

In the above formula, B equals the amount of the bet, ES equals the ES immediately before the bet was placed, and L equals the expected length of eligibility. For example, L is typically about 15 seconds, which is the length of an average spin plus a 10 second grace period. Further, t equals the time since the start of the previous spin, but does not include any time spent in a bonus game or during a tilt.

In some embodiments, the eligibility score may decay at either a fixed rate or a variable rate based on factors such as game state, reel spin roll-up time, tilts, reel spin duration, or other lengthy feature game play, for example, play of the CashWheel feature. In one embodiment, the gaming machine will display a representation of the current eligibility score. For example, the display might show a monetary value that the player is currently eligible to win should a bonus occur now. Pay table display 126 on FIG. 1D displays a description of Tournament Prize Meter 127 which indicates the maximum amount 129 the player is eligible to win in the event a tournament round is triggered by one of the participating gaming machines. In the example of FIG. 1, Tournament Prize Meter 127 indicates the player is currently eligible to win as much as $90 in a group play tournament.

Figure 1E:
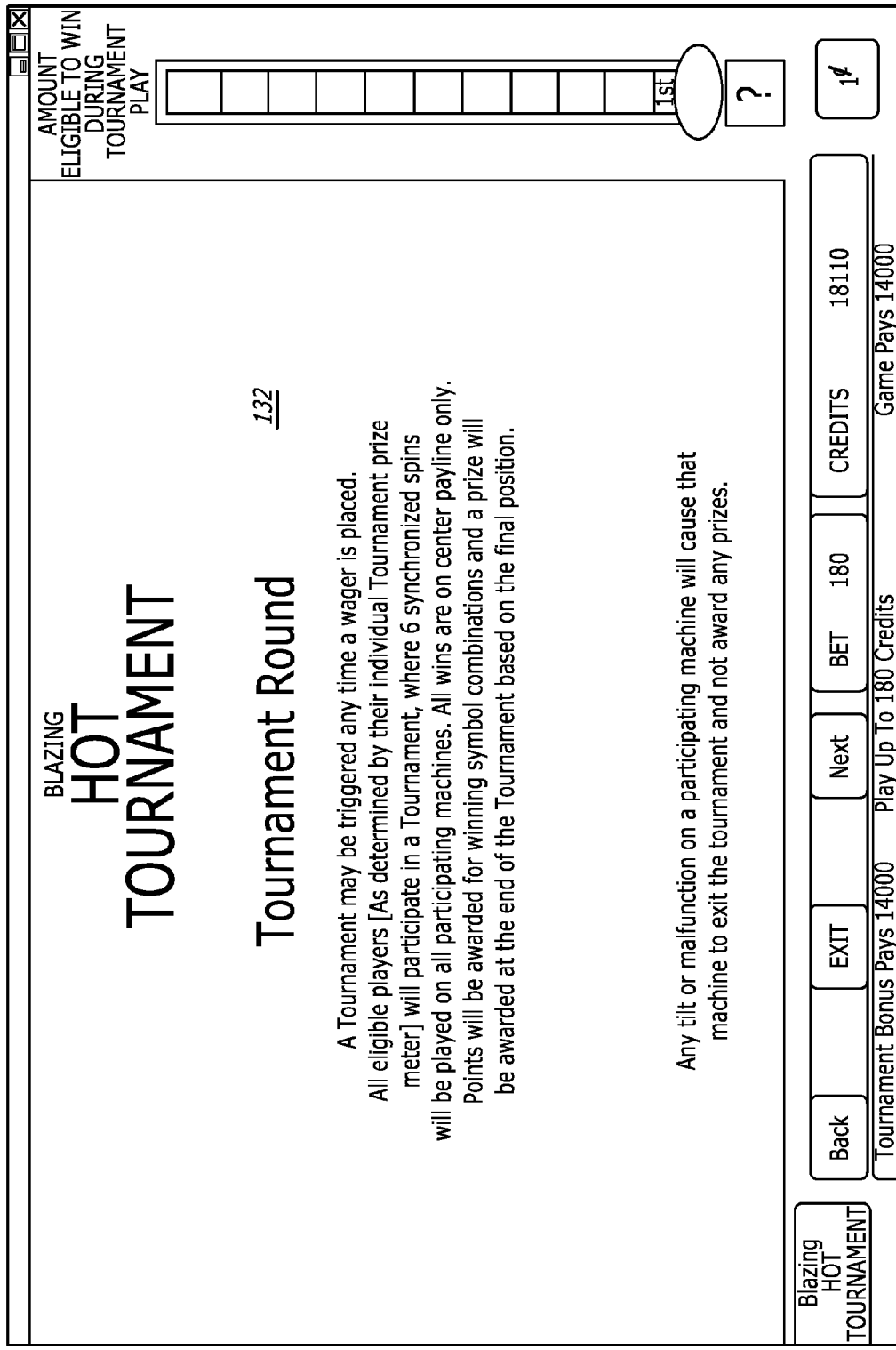
Figure 1F:
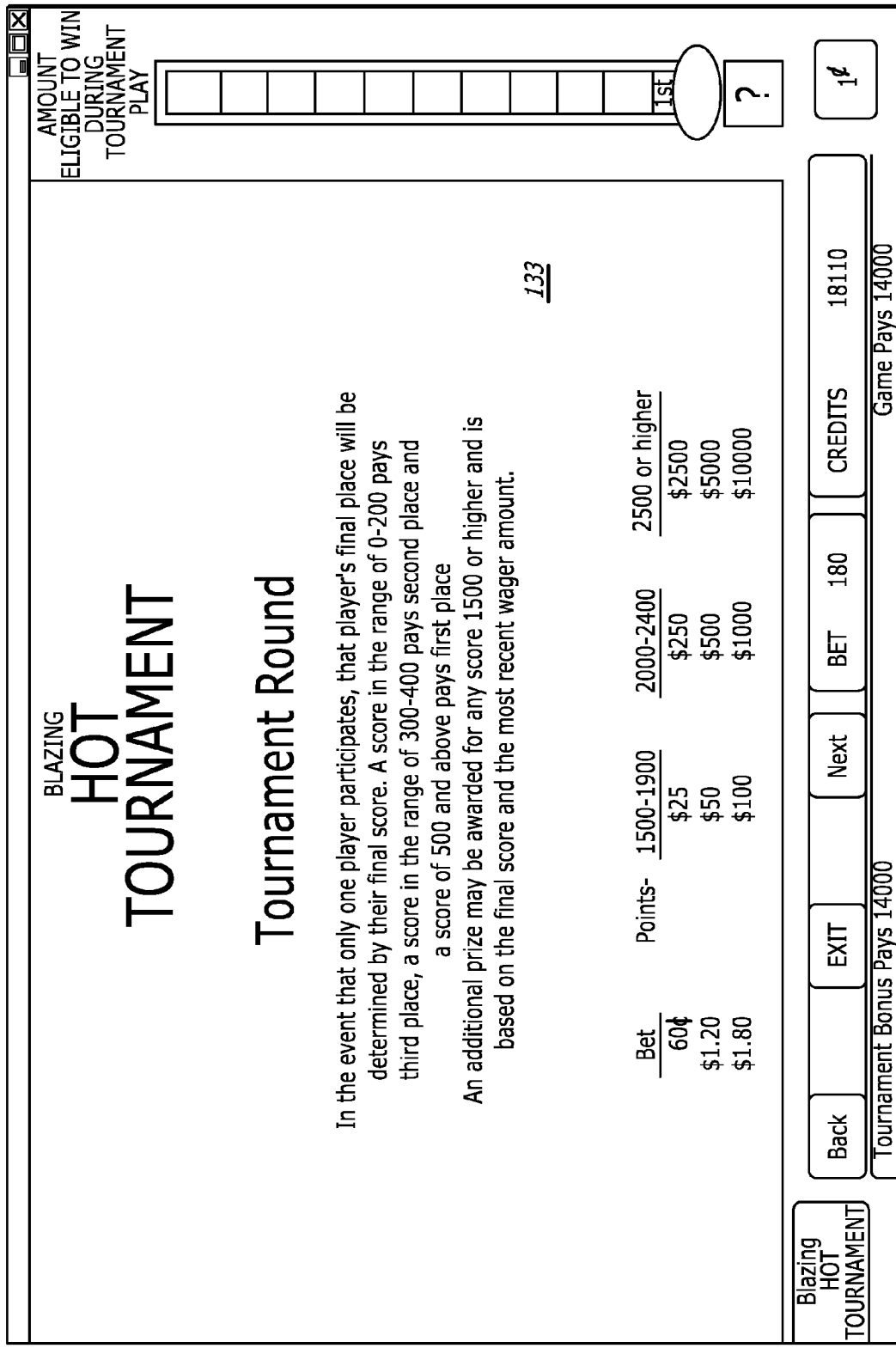

Pay table display 128 of FIG. 1E further displays rules 132 related to the triggering of a Tournament Round. Also, FIG. 1F depicts pay table display 130 that displays rules 133 relating to the triggering of a Tournament Round when only one player or gaming machine participates in the Tournament Round or group-play bonus feature. An example screen shot of the Tournament Round 136 is shown in FIG. 3. As shown, the player's score 137 is displayed along with the leader's score 138 to enhance excitement during the Tournament Round.

In one embodiment, when a bonus triggering event occurs and the gaming machine begins a new series of messages with the other gaming machines or network controller, a unique sequence ID is generated to coordinate, organize, and synchronize the subsequent message traffic between the network controller and all connected gaming machines. This sequence ID may be a timestamp, an alphanumeric or other such value, or a combination thereof generated by the network controller or by the initiating gaming machine. This unique sequence ID is included in each message and may be used by the network controller and the connected gaming machines to resolve issues such as multiple or simultaneous bonus triggers, power fail recovery, communication failure recovery, or any other anomalous condition. In a typical embodiment, should a gaming machine lose power during a series of messages; upon recovery, the sequence ID is used to determine whether or not the recovered gaming machine is synchronized with the other connected gaming machines. Corrective action can then be taken including, but not limited to, the recovered gaming machine abandoning the interrupted series of messages or the recovered gaming machine completing the actions of an interrupted bonus.

In one or more embodiments, each gaming machine communicates its current eligibility score to all other gaming machines connected to the network and continually updates this data. Based on the eligibility scores of all the gaming machines connected to the network, each gaming machine maintains a value of the expected total payout should the bonus be triggered at the current time. This is the current expected value (EV) of the bonus feature. Each gaming machine maintains multiple bonus pools, and each bonus pool corresponds with a range of expected values. Essentially, the gaming machines connected to the network use the eligibility scores from all connected gaming machines to determine which bonus pool(s) will be used for a group-play bonus feature. In one embodiment, the group-play bonus feature does not have a set pool.

When a player places a wager, the gaming machine determines which bonus pool to use for the upcoming game based on the current expected value. The gaming machine calculates the probability of a bonus trigger using the following formula:

$$P=(\text{Return \% of bonus}*\text{Bet})/(\text{Pool Limit}-\text{Pool Value})$$

In this above equation, P equals the probability of a bonus triggering event occurring. The "Return % of bonus" variable is the average return of the bonus game and the "Bet" variable is the current bet amount on the gaming machine. Further, the "Pool Limit" variable is the maximum value the bonus pool may have and the "Pool Value" variable is the current value of the bonus pool.

Based on the probability of triggering the bonus feature, the gaming machine may randomly initiate a bonus triggering event for all eligible gaming machines connected to the network. The triggering gaming machine deducts the expected value from the bonus pool. No one knows which machine triggered the feature. In some embodiments, each gaming machine averages its trigger frequency by incorporating average awards previously generated on the given machine. When a machine triggers and funds the bonus, that machine has a reduced chance of triggering again at that particular bonus level (for a while), but the other machines in the group are unaffected. Since no one knows which machine triggered the bonus and exactly how the other machines have been played or their results over time, no one can effectively predict the next trigger. This provides a novel way of providing "mystery" feature triggers in a group play environment.

Feature triggering events may also occur from other methods such as random selection independent of the game outcome, contribution amounts reaching specific levels, messages received from an external controller, a predefined number of games played, a predefined amount wagered, or other such methods and combinations of the above.

A triggering gaming machine or the network controller sends a message to each eligible gaming machine to coordinate the start of the group play feature. Each participating gaming machine periodically sends messages to the other participating gaming machines or the network controller with intermediate results during the course of the group play feature. These intermediate results may be used by the other participating gaming machines or the network controller to update connected displays for viewing by players, other casino patrons, and casino personnel to enhance the excitement of the game. Each participating gaming machine sends a message to the other participating gaming machines or the network controller with final results from the group play feature.

Each connected gaming machine that participated in the group play feature determines how well it performed relative to the other gaming machines, based on the final results. The gaming machines that had the best results from the group play feature may award the player with a feature award amount.

In one embodiment, there are a number of gaming machines connected to each other to form a peer-to-peer network. As casino patrons play at the networked gaming machines, portions of each wager are contributed to one or more bonus pools. During normal play on the gaming machines, each gaming machine maintains an eligibility score based on the casino patron's play and informs all other gaming machines connected to the network. When a gaming machine detects that a bonus triggering event has occurred, the triggering gaming machine sends a message to the other gaming machines connected to the network indicating that the bonus triggering event occurred, and then sends another message that the group play feature was triggered. The triggering gaming machine and all non-triggering gaming machines all send a message to the network that each gaming machine is ready to start the group play feature. The triggering gaming machine then sends another message or signal to each eligible gaming machine to begin the group-play bonus feature. After a synchronized start, each eligible or participating gaming machine begins the group-play bonus feature and intermediately sends results over the network to all other gaming machines. At the completion of the group-play bonus feature, each gaming machines sends a message that the group-play bonus feature has been completed and then sends its final result to all of the participating gaming machines. All eligible gaming machines send a message to the network that the group-play bonus feature is complete and terminates the current messaging series. Finally, each gaming machine awards its player with an appropriate bonus amount or other award.

Figure 4:
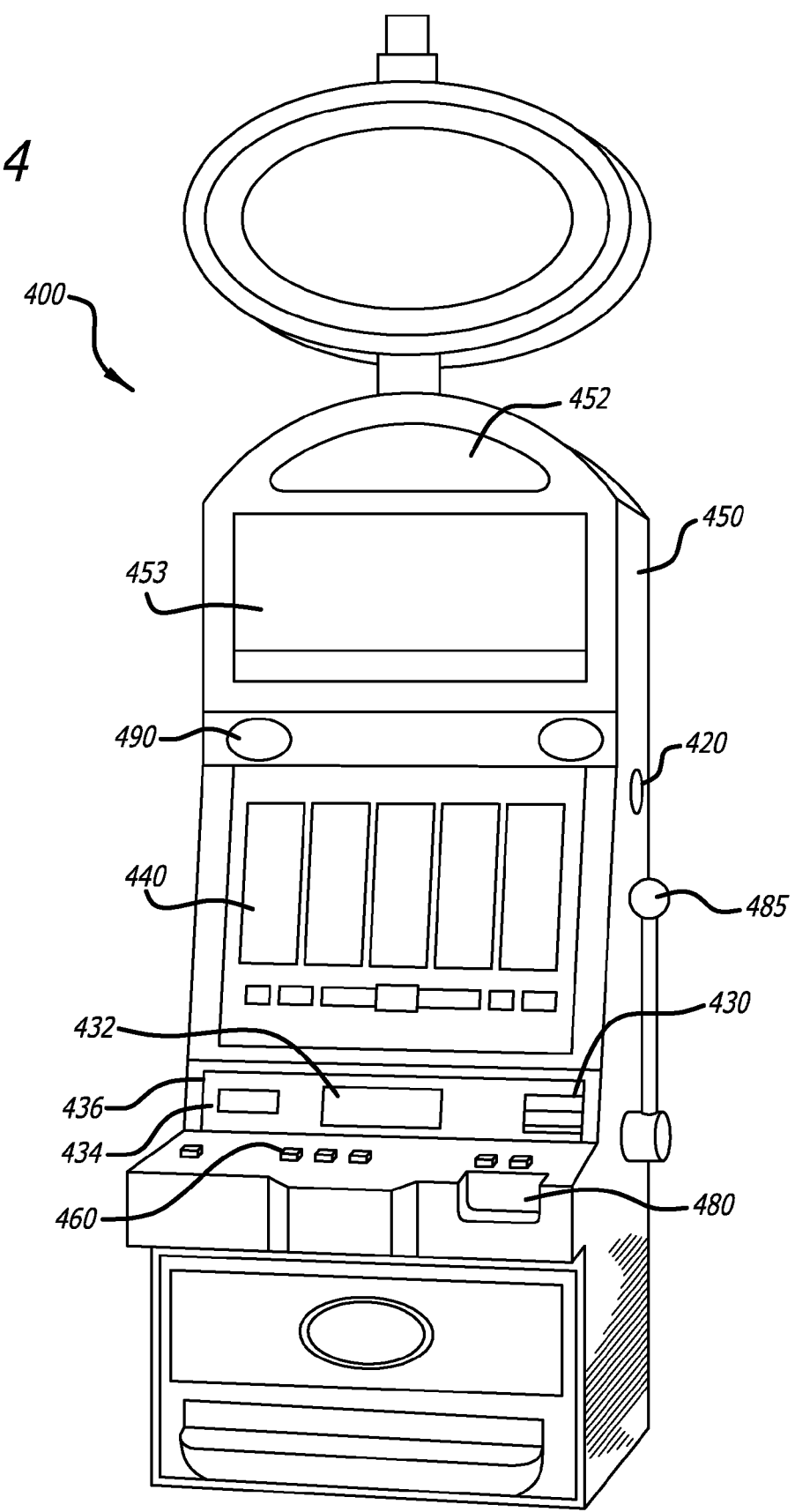
FIG. 4 is a perspective view of a gaming machine in accordance with one or more embodiments.

In accordance with one or more embodiments, FIG. 4 illustrates a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480 and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

The plurality of player-activated buttons 460 may be used for various functions such as, but not limited to, selecting a wager denomination, selecting a game to be played, selecting a wager amount per game, initiating a game, or cashing out money from gaming machine 400. Buttons 460 function as input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 440 may also present information such as, but not limited to, player information, advertisements and casino promotions, graphic displays, news and sports updates, or even offer an alternate game. This information may be generated through a host computer networked with gaming machine 400 on its own initiative or it may be obtained by request of the player using either one or more of the plurality of player-activated buttons 460; the game display itself, if game display 440 comprises a touch screen or similar technology; buttons (not shown) mounted about game display 440 which may permit selections such as those found on an ATM machine, where legends on the screen are associated with respective selecting buttons; or any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 5A:
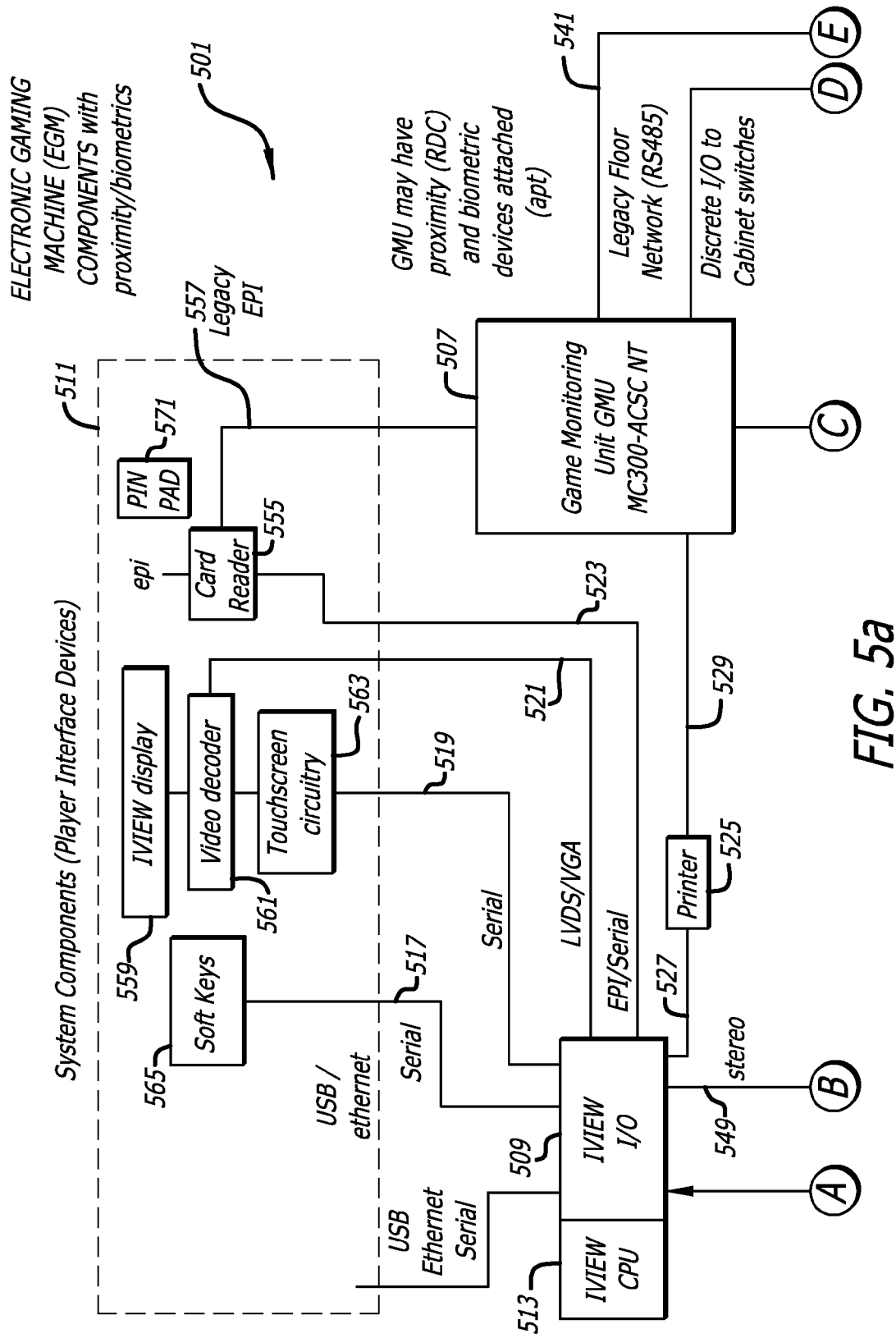
FIGS. 5a and 5b depict a block diagram of the physical and logical components of the gaming machine of FIG. 4.
Figure 5B:
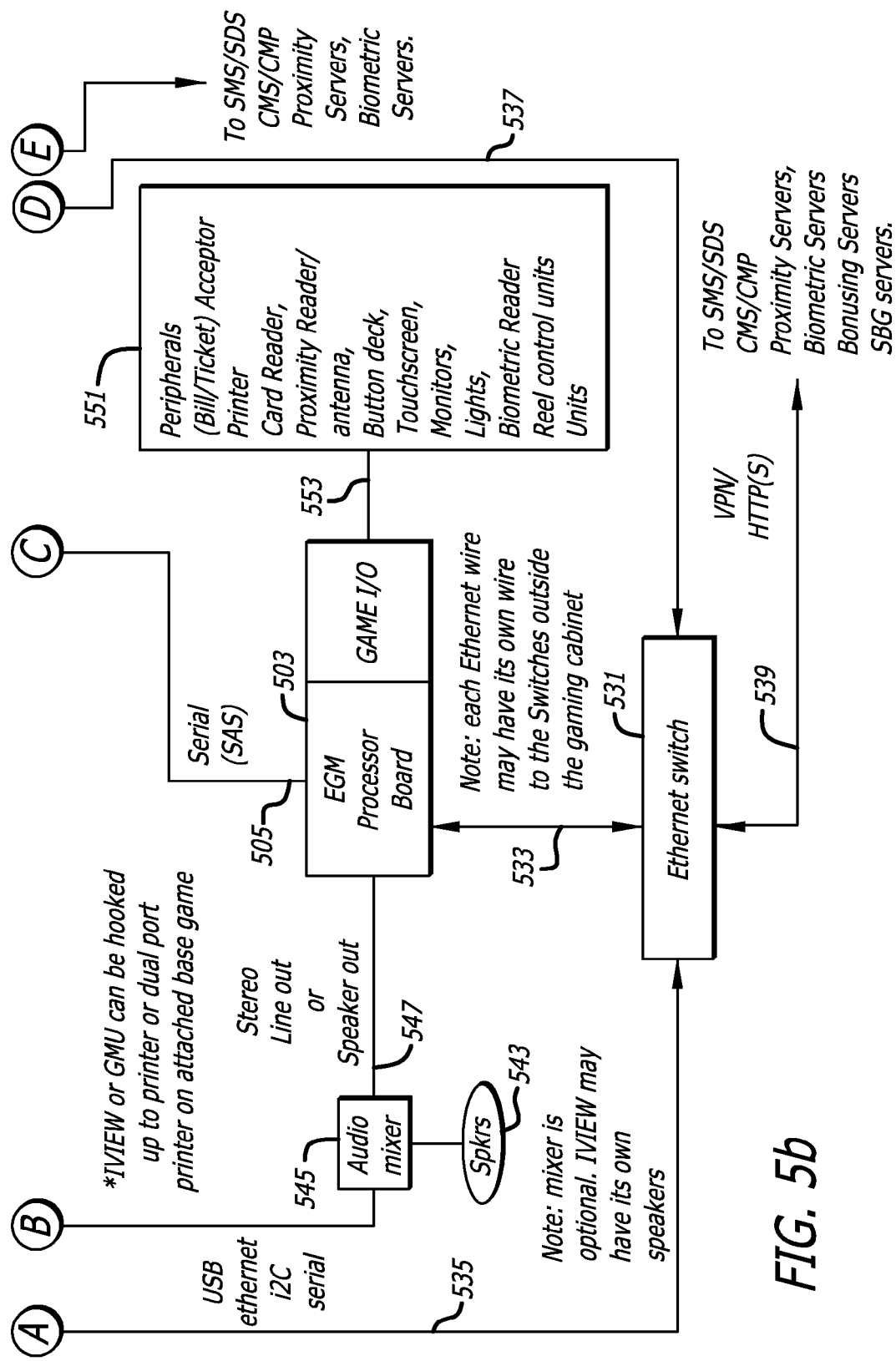

Referring to FIGS. 5a and 5b, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iView unit. Coding executed on EGM Processor Board 503, PID 509, and/or GMU 507 may be upgraded to integrate a game having a group play feature game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having a group play feature game. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 400; for example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, display 559 through video decoder 561 and bus 521, such as an LVDS or VGA bus.

As part of its programming, the PID processor executes coding to drive display 559 and provide messages and information to a player. Touch screen circuitry interactively connects display 559 and video decoder 561 to PID 509, such that a player may input information and cause the information to be transmitted to PID 509 either on the player's initiative or responsive to a query by PID 509. Additionally soft keys 565 connect through bus 517 to PID 509 and operate together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iVIEW processing board and game monitoring unit (GMU) processing board. The GMU and iVIEW can combined into one like the commercially available Bally GTM iVIEW device. This device may have a video mixing technology to mix the EGM processor's video signals with the iVIEW display onto the top box monitor or any monitor on the gaming device.

Figure 6:
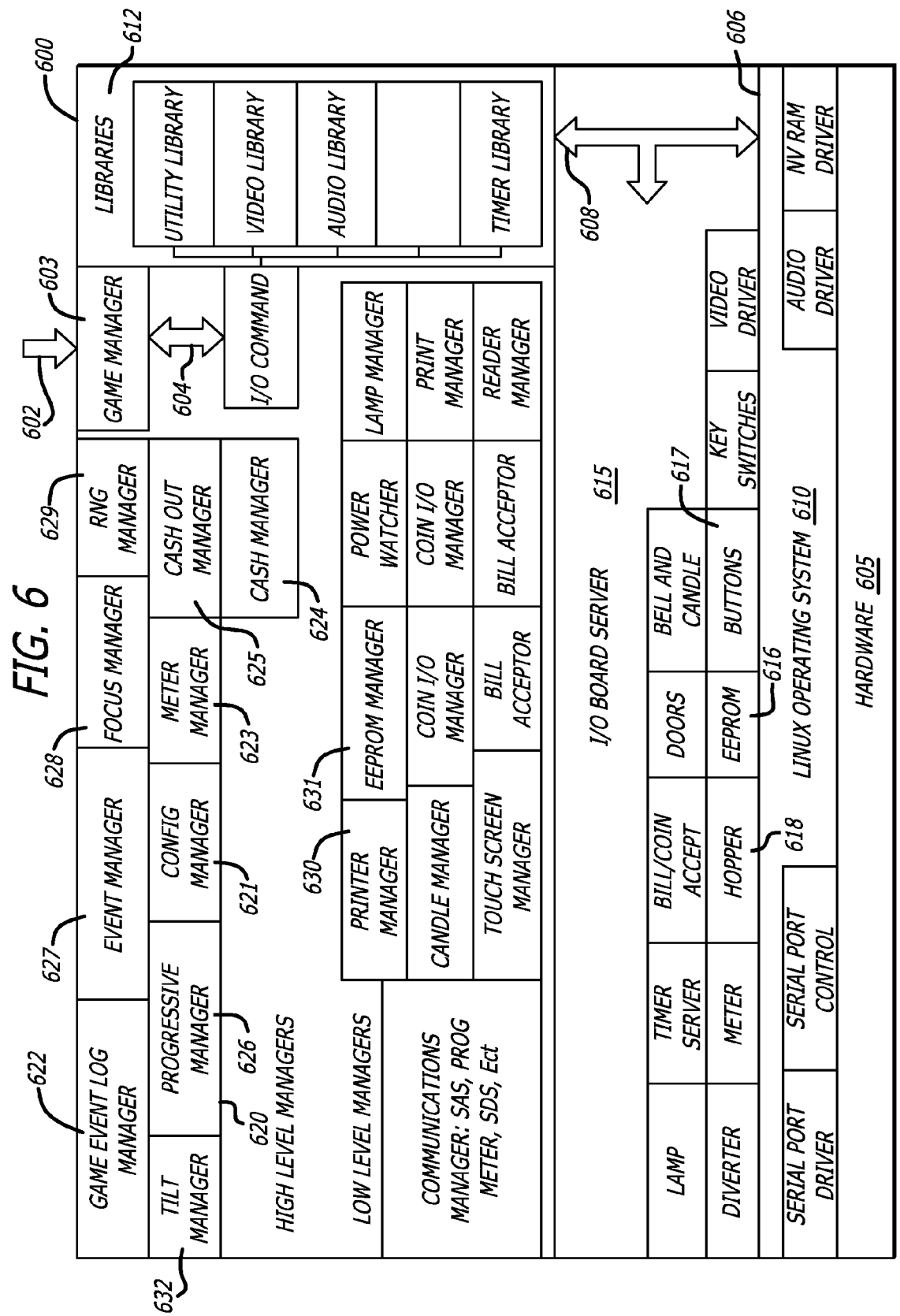
FIG. 6 is a block diagram of the logical components of a gaming kernel in accordance with one or more embodiments of the invention.

In accordance with one or more embodiments, FIG. 6 is a functional block diagram of a gaming kernel 600 of a game program under control of processor board 503, uses gaming kernel 600 by calling into application programming interface (API) 602, which is part of game manager 603. The components of game kernel 600 as shown in FIG. 6 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's (622) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash in (624) and cash out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a callback posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kemal for Game Cabinets" and provisional U.S. patent application Ser. No. 60/313,743, entitled "Form Fitting Upgrade Board Set For Existing Game Cabinets," filed Aug. 20, 2001; said patent and provisional are both fully incorporated herein by explicit reference.

Figure 7:
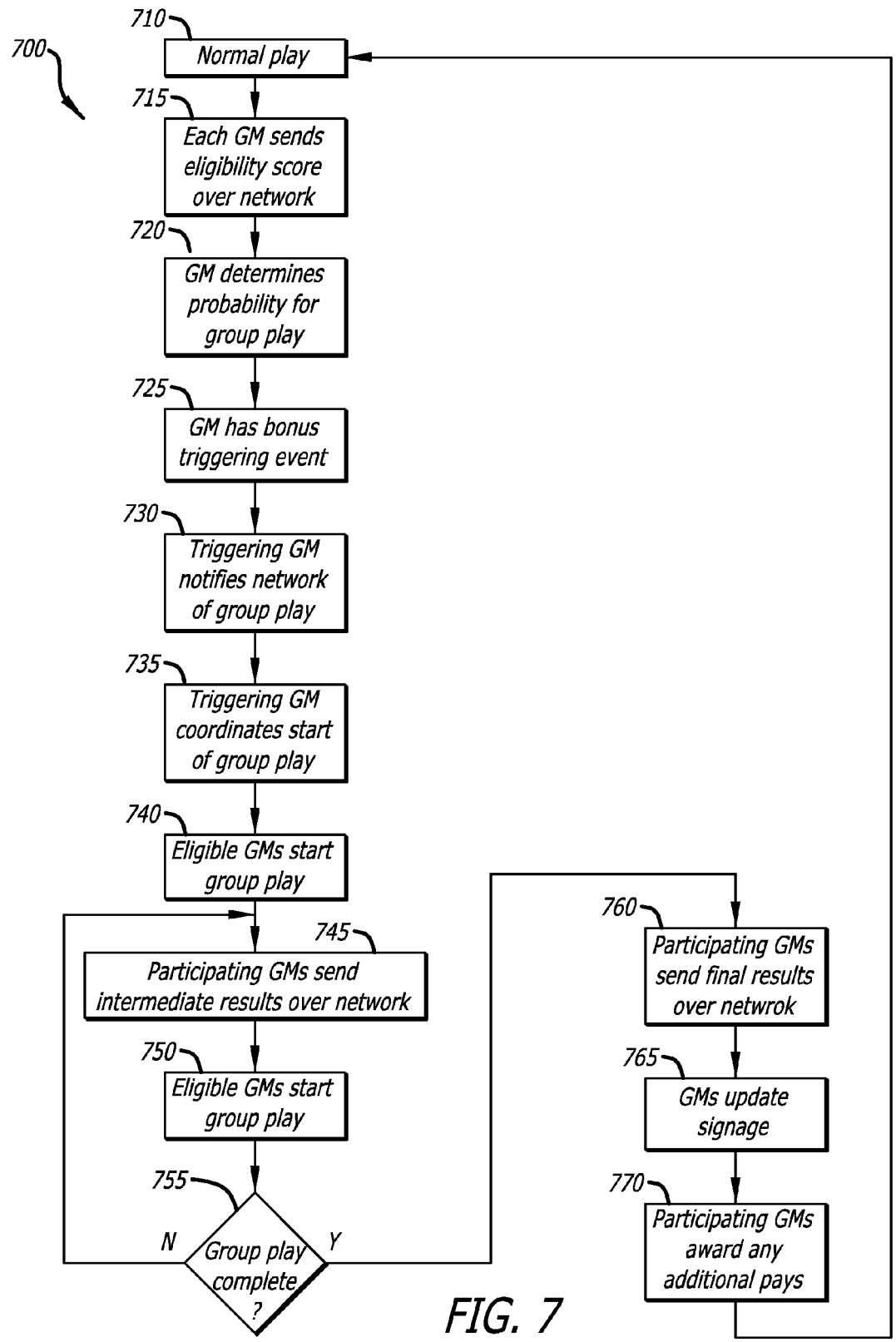
FIG. 7 is a functional block diagram depicting the steps associated with carrying out an example method in accordance with one or more embodiments.

A logical flow diagram generally depicting the steps associated with a method 700 for carrying out a game having a group play feature, in accordance with one embodiment, is presented in FIG. 7. The order of actions as shown in FIG. 7 is only illustrative, and should not be considered limiting. For example, the order of the actions may be changed, additional steps may be added or some steps may be removed without deviating from the scope and spirit of the invention.

First at block 710, each of a group of gaming machines present normal game play. As described above, the gaming machines may accept various wagers and present games of chance such as, but not limited to, a video or mechanical reel slot machine, a video keno game, a video poker game, a lottery game, a bingo game, a Class II bingo game, a roulette game, a craps game, a blackjack game, a mechanical or video representation of a wheel game or the like.

At block 715, each participating gaming machine calculates an eligibility score for group feature play. In the example above, one possible formula for determining an eligibility score could be as follows. The ES should be set to zero whenever: 1) the credit meter drops to zero, 2) the player is involved in a group-play bonus, and 3) a specific length of time has elapsed since the end of the last game, for example, 10 seconds, although any length of time can be set by the system before resetting the ES to zero. When the gaming machine is eligible, the ES should be a measurement of the rate with which the player is betting. In one embodiment, whenever the player makes a bet, the ES may be set to:

$$(B+(ES(L-t)))/L$$

In the above formula, B equals the amount of the bet, ES equals the ES immediately before the bet was placed, and L equals the expected length of eligibility. For example, L is typically about 15 seconds, which is the length of an average spin plus a 10 second grace period. Further, t equals the time since the start of the previous spin, but does not include any time spent in a bonus game or during a tilt. Variations of this or other formulas may be used to calculate eligibility.

At block 720, each gaming machine determines its probability for initiating group play. For example, when a player places a wager, the gaming machine determines which bonus pool to use for the upcoming game based on the current expected value. The gaming machine calculates the probability of a bonus trigger using, by way of example, the following formula:

$$P=(\text{Return \% of bonus}*\text{Bet})/(\text{Pool Limit}-\text{Pool Value})$$

In this above equation, P equals the probability of a bonus triggering event occurring. The "Return % of bonus" variable is the average return of the bonus game and the "Bet" variable is the current bet amount on the gaming machine. Further, the "Pool Limit" variable is the maximum value the bonus pool may have and the "Pool Value" variable is the current value of the bonus pool. The gaming machine then contributes an appropriate amount to the bonus pool.

A triggering gaming machine sends a message to each eligible gaming machine that group play is about to begin at block 730 and sends subsequent messages to further coordinate the start of the group play feature at block 735. The eligible gaming machines then each play the group play feature at block 740. At block 745, each participating gaming machine periodically sends messages to the other participating gaming machines (or the network controller) with intermediate results during the course of the group play feature. These intermediate results may be used by the other participating gaming machines or the network controller to update connected displays for viewing by players, other casino patrons, and casino personnel to enhance the excitement of the game, block 750. The cycle between blocks 745 and block 750 iterates until group play is complete, after which each participating gaming machine sends a message to the other participating gaming machines or the network controller with final results from the group play feature at block 760. The final results are posted on connected displays at block 765.

Each connected gaming machine that participated in the group play feature determines how well it performed relative to the other gaming machines, based on the final results. The gaming machines that had the best results from the group play feature may award the player with a feature award amount at block 770, after which normal game pay resumes at each gaming machine at block 710.

Figure 8A:
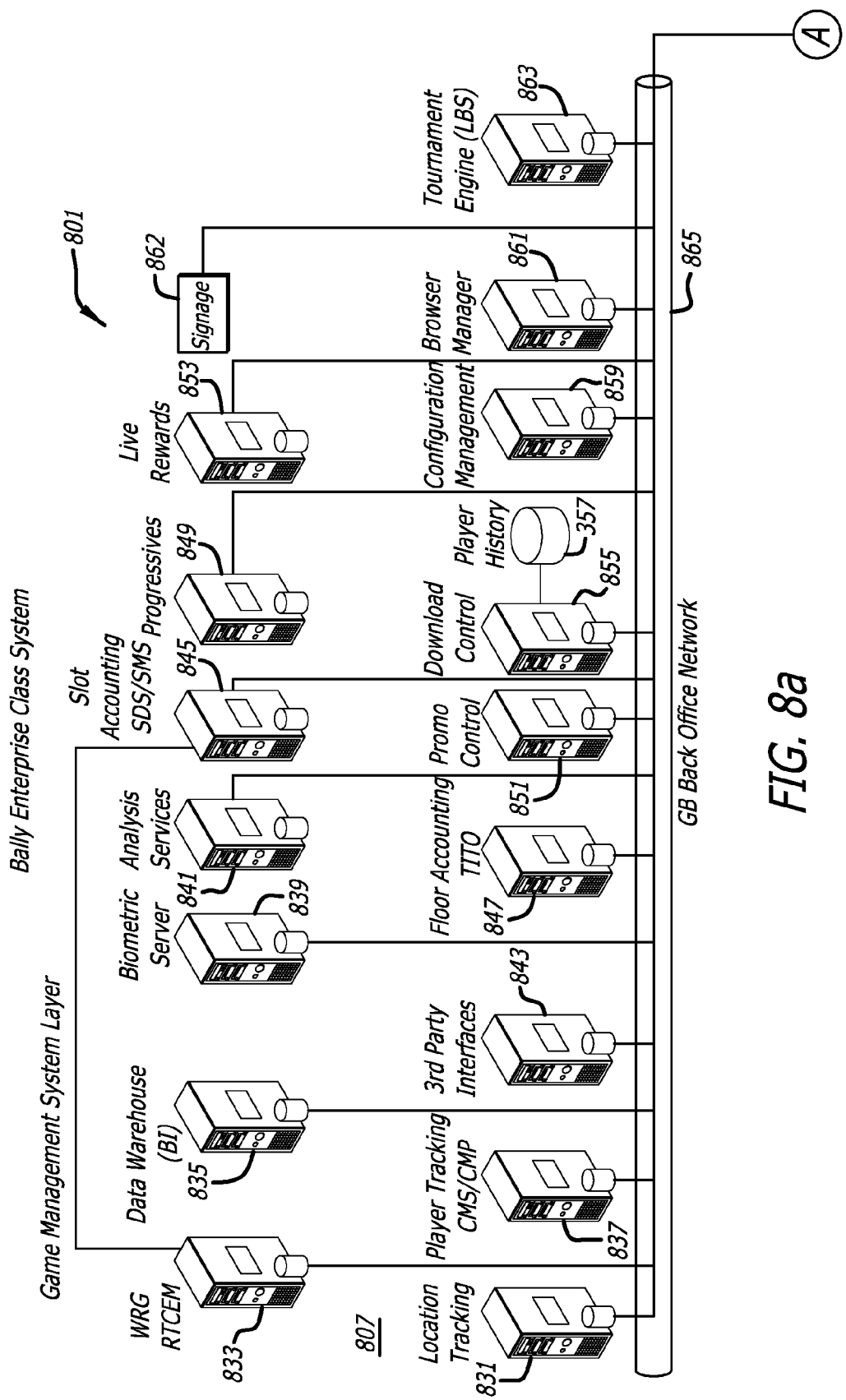
FIGS. 8a and 8b depict a schematic block diagram showing the hardware elements of a networked gaming system in accordance with one or more embodiments.
Figure 8B:
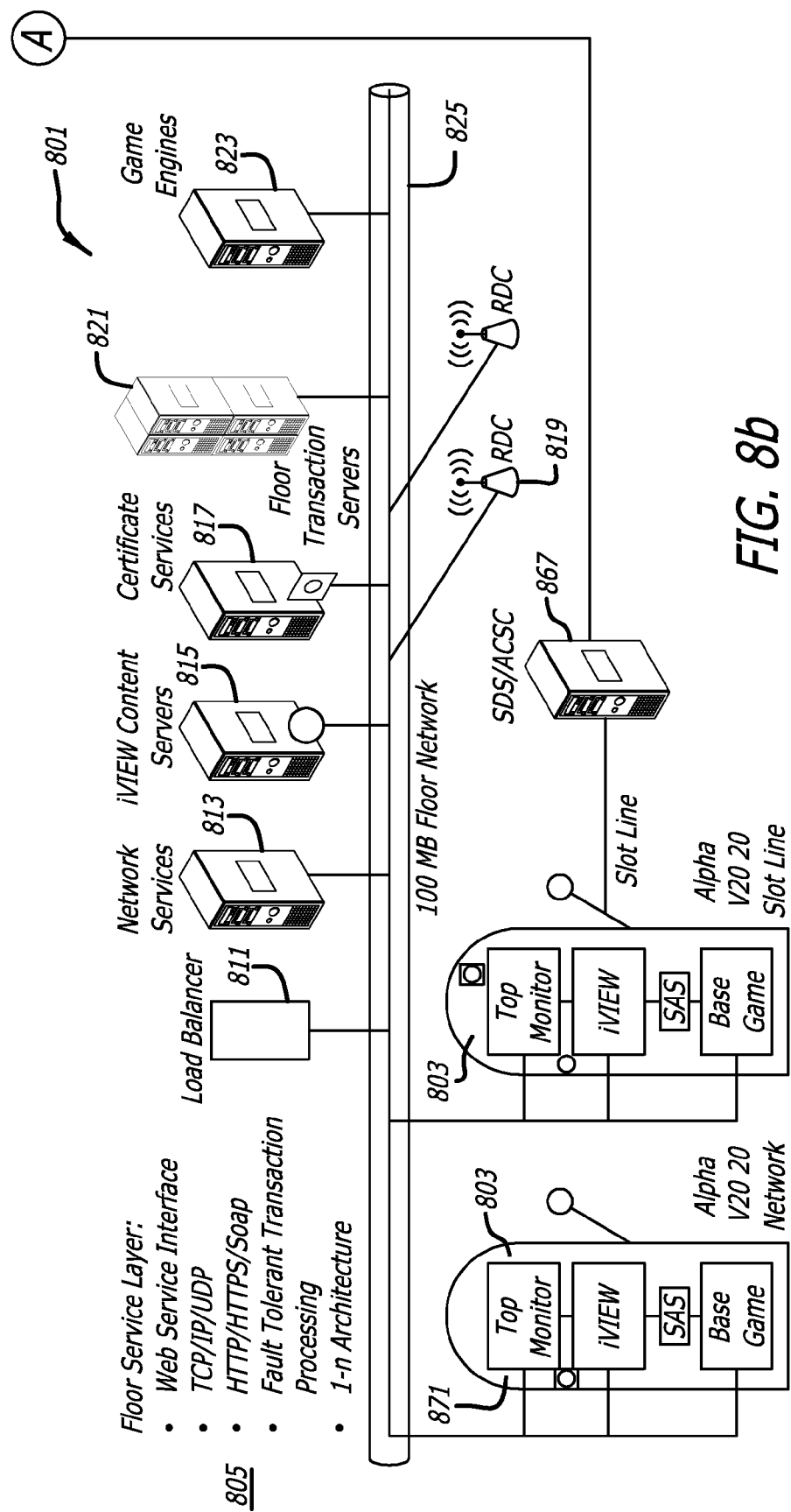

Referring to FIGS. 8a and 8b, enterprise gaming system 801 is shown in accordance with one or more embodiments. Enterprise gaming system 801 may include one casino or multiple locations and generally includes a network of gaming machines 803, floor management system (SMS) 805, and casino management system (CMS) 807. SMS 805 may include load balancer 811, network services servers 813, player interface (iVIEW) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 305 servers and devices, firmware, media, operating systems, and configurations may be downloaded to the system components of respective gaming machines for upgrading or managing floor content and offerings in accordance with operator selections or automatically depending upon CMS 807 and SMS 805 master programming. The data and programming updates to gaming machines 803 are authenticated using conventional techniques prior to install on the system components.

In various embodiments, any of the gaming machines 803 may be a mechanical reel spinning slot machine, video slot machine, video poker machine, video bingo machine, keno machine, or a gaming machine offering one or more of the above described games including a group play game. Alternately, gaming machines 803 may provide a game with a group play feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Play Gaming," filed on Nov. 9, 2007, which is hereby incorporated by reference in its entirety for all purposes.

Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method in a networked system to provide group play for respective end users of a plurality of game machines, the method comprising:
    establishing a group of gaming machines connected to each other over a network and each gaming machine including an end user display, wherein the group of gaming machines includes two or more gaming machines;
    maintaining an eligibility score on each gaming machine, the eligibility score being based on a wager amount and rate of play for players at each gaming machine, and the eligibility score indicates eligibility to participate in a group-play bonus feature;
    communicating the eligibility score of each gaming machine to all other gaming machines in the group of gaming machines;
    initiating, by a triggering gaming machine, the group-play bonus feature when a triggering event is detected by the triggering gaming machine, wherein the triggering gaming machine funds the group-play bonus feature and sends a message to eligible gaming machines within a peer-to-peer networked group of gaming machines that coordinates the start of the group-play bonus feature;
    providing intermediate results of all end users of the group of gaming machines during the group-play bonus feature to eligible gaming machines on each end user gaming machine display, wherein each eligible gaming machine periodically sends a message with the intermediate results of all end users of the group of gaming machines during group-play bonus feature to the other eligible gaming machines;
    providing final results from the group-play feature to eligible gaming machines; and
    apportioning a bonus award from the group-play bonus feature to eligible gaming machines.

2. The method of claim 1, wherein the group of gaming machines are connected to each other in a peer-to-peer environment.

3. The method of claim 1, wherein the group of gaming machines are connected to each other through a network controller.

4. The method of claim 1, further comprising contributing a percentage of each wager from each gaming machine to one or more bonus pools.

5. The method of claim 4, further comprising determining which bonus pool to use for the group-play feature based on the eligibility scores from all gaming machines in the group of gaming machines.

6. The method of claim 4, wherein the one or more bonus pools are maintained by the each gaming machine.

7. The method of claim 4, wherein the one or more bonus pools are maintained by a network controller through which the gaming machines are connected together.

8. The method of claim 1, wherein the eligibility score is maintained by an associated control program of the gaming machines.

9. The method of claim 1, wherein the eligibility score is a Boolean value indicating if the gaming machine is eligible to participate in the group-play bonus feature or not eligible to participate in the group-play bonus feature.

10. The method of claim 1, wherein each eligible gaming machine provides all other eligible gaming machines with intermediate results during the group-play bonus feature.

11. The method of claim 1, wherein the bonus award is apportioned to eligible gaming machines based on the final results of each eligible gaming machine.

12. A networked system configured to provide group play for respective end users of a plurality of gaming machines, comprising:
    a group of gaming machines connected to each other over a network in a peer-to-peer environment, each gaming machine including an associated control program to maintain an eligibility score that indicates if a gaming machine is eligible to participate in a group-play bonus feature and including an end user display;

wherein during a normal play mode, each gaming machine sends its eligibility score to all other gaming machines in the group of gaming machines;

wherein a triggering gaming machine randomly initiates the group-play bonus feature, wherein the triggered gaming machine funds the group-play bonus feature, and wherein the triggered gaming machine sends a message to all eligible gaming machines within a peer-to-peer networked group of gaming machines and coordinates the start of the group-play bonus feature;

wherein each gaming machine participating in the group-play bonus feature periodically sends a message with intermediate results of all end users of the group of gaming machines during the group-play bonus feature to the eligible gaming machines on each end user gaming machine display, and each gaming machine participating in the group-play bonus feature sends final results from the group-play bonus feature to the eligible gaming machines.

13. The system of claim 12, wherein the eligibility score is based on a bet amount and rate of play for players at each gaming machine.

14. The system of claim 12, wherein a percentage of each wager from each gaming machine is contributed to one or more bonus pools maintained by each gaming machine.

15. The system of claim 14, wherein one bonus pool of the triggered gaming machine funds the entire group-play bonus feature.

16. The system of claim 14, wherein the triggered gaming machine determines which bonus pool to use for the group-play feature based on the eligibility scores from all gaming machines in the group of gaming machines.

17. A method in a networked system to provide group play for respective end users of a plurality of game machines, the method comprising:

establishing a group of gaming machines connected to each other over a network and each gaming machine including an end user display;

establishing one or more bonus pools maintained by each gaming machine, and contributing a percentage of each wager placed on the gaming machines to the bonus pool;

maintaining an eligibility score at each gaming machine, the eligibility score being based on a wager amount and rate of play for players at each gaming machine, and the eligibility score indicates eligibility to participate in a group-play bonus feature that is funded by the bonus pool;

communicating eligibility scores from each gaming machine to all networked gaming machines and maintaining an expected value of the bonus pool on each gaming machine based on the eligibility score of all networked gaming machines;

initiating, by a triggering gaming machine, the group-play bonus feature, wherein the triggering gaming machine sends a message to eligible gaming machines within a peer-to-peer networked group of gaming machines that coordinates the start of the group-play bonus feature, and wherein the triggering gaming machine funds the group-play bonus feature and has a reduced chance of triggering again compared to the other gaming machines in the peer-to-peer networked group; and providing intermediate and final results of all end users of the group of gaming machines of the group-play bonus feature from each eligible gaming machine to other eligible gaming machines on each end user gaming machine display, wherein each eligible gaming machine periodically sends a message with the intermediate results of all end users of the group of gaming machines during group-play bonus feature to the other eligible gaming machines.

18. The method of claim 17, further comprising generating a unique sequence ID when the group-play bonus feature is initiated to coordinate messages between eligible gaming machines during the group-play bonus feature.

19. The method of claim 17, wherein the eligibility score is maintained by an associated control program on each gaming machine.

20. The method of claim 17, further comprising determining which bonus pool to use for the group-play bonus feature based on the eligibility scores from all gaming machines in the group of gaming machines.

* * * * *

UNITED STATES PATENT AND TRADEMARK OFFICE
CERTIFICATE OF CORRECTION

PATENT NO. : 9,177,287 B2  
APPLICATION NO. : 12/619030  
DATED : November 3, 2015  
INVENTOR(S) : Joseph Kisenwether and Dougal Austin Page 1 of 1

It is certified that error appears in the above-identified patent and that said Letters Patent is hereby corrected as shown below:

In the specification,

Column 3, In line 4, delete "may be funded"

Column 8, In line 4, delete "s" from "machines"

Signed and Sealed this
Eighth Day of March, 2016

Michelle K. Lee
*Director of the United States Patent and Trademark Office*